(No Model.)
A. A. McCANDLISS.
PROCESS OF AND APPARATUS FOR MANUFACTURING ARTIFICIAL STONE.
No. 301,617. Patented July 8, 1884.
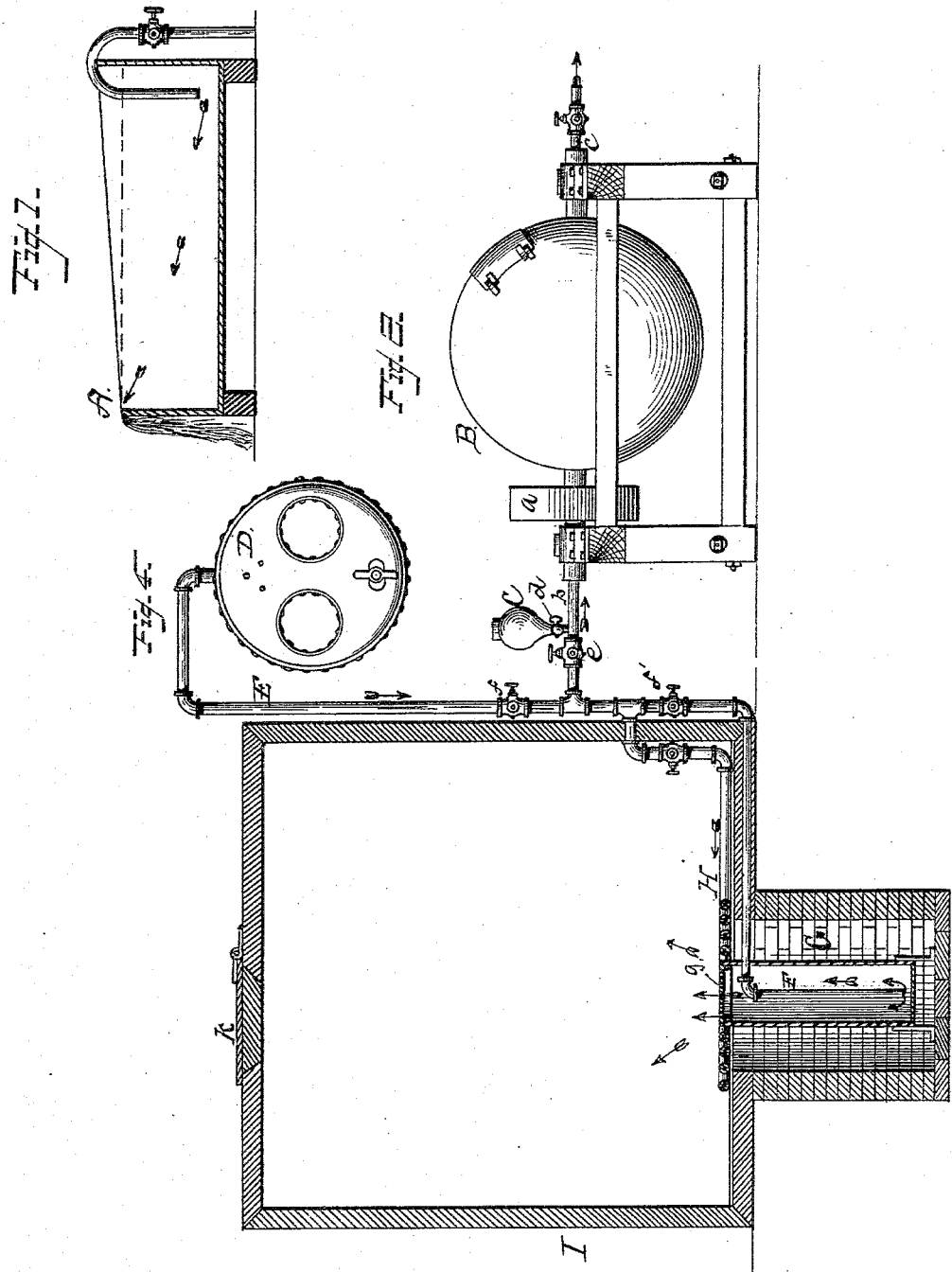
WITNESSES
F. L. Durand
J. Heylmun
INVENTOR
A. A. McCandliss.
by A. G. Heylmun,
Attorney.

UNITED STATES PATENT OFFICE.

AMOS A. McCANDLISS, OF PIQUA, OHIO.

PROCESS OF AND APPARATUS FOR MANUFACTURING ARTIFICIAL STONE.

SPECIFICATION forming part of Letters Patent No. 301,617, dated July 8, 1884.

Application filed July 25, 1883. (No model.)

*To all whom it may concern:*

Be it known that I, AMOS A. McCANDLISS, a citizen of the United States of America, residing at Piqua, in the county of Miami and State of Ohio, have invented certain new and useful Improvements in Process of and Apparatus for Manufacturing Artificial Stone; and I do hereby declare the following to be a full, clear, and exact description of the invention, such as will enable others skilled in the art to which it appertains to make and use the same.

My invention relates to a process of and apparatus for preparing the material in the manufacture of artificial stone.

Heretofore it has been usual to give but little attention to the preliminary preparation of the sands used for mixing with the cements, or the methods employed have failed to properly and thoroughly cleanse the sands of impurities, which in the progress of induration, and subsequent thereto, develop imperfections which lessen the strength of the material, and at the same time disfigure the surface of the mold. These defects and disfigurements are largely due to the presence of alkali in the indurated material, which has not been eliminated in the course of preparation, admixture, and induration, and find their escape to the surface of the stone, forming spots or blotches, which greatly disfigure the appearance of the stone and impair its value.

Hence the objects of my invention are to provide a method of preparing and treating the material of which the stone is composed before molding them into shape, whereby the impurities, which consist, principally, of alkali substances, are wholly and thoroughly eliminated.

My invention further consists, as a step in the process of preparing the materials for making artificial stone, in subjecting the sand to be used as one of the ingredients to a bath of water, and then confining the sand in a suitable vessel, preferably while being agitated, and subjecting it to a heated vapor-bath of sulphuric acid and steam.

My invention further consists in washing the sand to be used as one of the ingredients with water until thoroughly cleansed, then confining it in a vessel and subjecting it, with or without agitation, to the vapors of sulphuric acid and steam, then mixing the cleansed and purified sand with cement, and molding the plastic material into shapes, then submitting the formed molds in a closed chamber to the action of the vapor-bath composed of sulphuric acid, hydrochloric acid, carbonic acid, and steam until indurated.

To profitably, certainly, and properly effect the objects of my improved process, I have invented the apparatus and appliances hereinafter described, and shown in the accompanying drawings, forming a part of this specification, wherein Figure 1 represents a sand-washing trough. Fig. 2 represents a purifying-vessel and adjuncts. Fig. 3 is the indurating-chamber and vaporizer, and Fig. 4 is the steam-boiler.

The letter A represents a box or trough, suitably constructed, but preferably having the end where the water enters somewhat higher than the overflow end and the sides inclining from the deeper end to the other end, in order that the overflow may be confined and properly directed. The water may be turned into this box or trough by any suitable means—such as a common water-pipe—the water-flow being regulated by a stop-cock, as shown in the drawings.

The letter B represents a metallic vessel, preferably spherical in form, and made of sufficient strength to insure safety under pressure from outside or from inside. This vessel or boiler is supported on trunnions, which are journaled on benches, and has the pulley $a$ fixed to one of said trunnions for the purpose of applying the rotating power. The trunnions of this vessel are bored out, and have fitted and lined thereto the pipes $b$ and $c$, the former of which serves as the means of inducting the steam and vapor to the vessel, and the latter serving as the means for letting off the vapors when the sand in the vessel has been subjected to the purifying process long enough to serve the purpose intended. The pipe $b$ has fixed to it the acid-chamber C, in which is the stop-cock $d$, and in turn this pipe is supplied with the stop-cock $e$, the former of which admits or turns off the flow of sulphuric acid, and the latter turns off or admits steam into the purifying vessel or boiler from the main steam-pipe.

While I have shown the purifying vessel or boiler B spherical in shape, this form is not absolutely necessary, since it may be cylindrical, and the rotary motion be dispensed with as a means for agitating the sand. It is preferable, however, that the form shown be used, and also that the vessel be rotated, since the disturbance of the contents exposes continually new portions of the sand to the action of the vapors, and thus hastens and insures the purification.

The letter D represents a steam-boiler of any convenient size and located in any convenient place. Connected to the boiler is the steam-pipe E, extending therefrom into the vaporizer, located in or below the floor of the indurating-room, as hereinafter more fully stated. In the drawings the steam-pipe E is shown running from the boiler down on the outside of the indurating-room, and thence, under the floor thereof, down into the vaporizing-chamber F, substantially as shown. The steam-pipe is supplied with cocks $f$ and $f'$, the former of which is so located as to cut off the passage of the steam from the boiler to any of the pipes located below it, and the latter cuts off or admits the passage of steam to the vaporizer.

The letter F represents the vaporizing-chamber, the shape of which is shown in the drawings as cylindrical; but it may be of any other desired shape, and of such material as to withstand the action of the acids used in it. It is provided with a close-fitting perforated cap or top, G, and its size is according to the size of the curing-room to be supplied. It is placed below the surface and supported on legs, substantially as shown, in the chamber G, constructed to receive it, and placed with its top even or near the floor of the curing-room, so that the vapors may enter the room and circulate freely throughout it. Connected with the main steam-pipe E is the steam-pipe H, brought along the floor of the curing-room and coiled over the pit holding the vaporizer, or otherwise suitably disposed in the room. The object of this pipe and coil is to convey live steam from the boiler and serve as heating means to preserve the rarity of the vapors in the curing-room and give additional heat therein.

The letter I represents the curing or indurating chamber, wherein are placed the finished molds to be hardened. It is provided with means for ingress and exit, and has a trap-door, $k$, hinged in the roof for the purpose of relieving pressure, or, when desired, to allow the steam and fumes to escape.

To effectuate the objects of my invention by means of the apparatus hereinbefore described, I place the sand in such quantity as may be desired in the box or trough, and turn on the water through the pipe, causing the water to pass through the sand by constantly stirring it, the water in the meantime filling the box, overflows at the lower end, and carries off all light matter and earthy material, leaving the sand bright and clean. I then place the sand in the purifying-boiler B and close the same tight and securely. Steam is then admitted through the pipe $b$, and at the same time the sulphuric acid is admitted to the pipe, and, finding its way to the steam-pipe, is carried, mixed with the steam, to the purifying-chamber, which, being rotated, acts on the impurities of the sand and destroys the alkalies. After the sand has thus been subjected to this bath sufficiently to destroy all the alkali in the sands, the acid is turned off, the stop-cock in pipe $c$ is opened, and live steam caused to pass through the purifier, which removes the gases generated therein and completes the process of purifying the sand.

As heretofore stated, it is not absolutely necessary that the purifier should be rotated while the sand is being subjected to the purifying process; but it is preferable, because the end is hastened, and the work done more thoroughly. I now mix this cleansed and purified sand with the proper proportion of cement, and mold the material into such shapes as may be desired, which being accomplished, the molds, after becoming sufficiently hard to bear removing, are placed in the curing-room. I now prepare an admixture of sulphuric acid, hydrochloric acid, and carbonic acid with distilled water in such quantity as may be required, and pour the mixture in the vaporizer and put the top on. Live steam is then turned on through the main steam-pipe leading into the vaporizer, which causes the acids to effervesce and the mixed vapors to rise up through the perforations in the top of the vaporizer into the curing-room, where, coming in contact with the unfinished stones, they harden the molds and produce on them a surface very bright and smooth, and make them so hard as to resist the action of frost or atmospheric changes.

In order to have the vaporization maintained and rarefied, steam is let into the coil of heating-pipes, and the temperature of the room thus kept in any desired condition. When the induration has progressed to completion, the steam is turned off from the pipes, and the molds allowed to cool, when they are removed.

I am aware that steam and carbonic acid commingled and set free in an indurating-chamber containing the molded material have been used before my invention of the process herein described, and I make no claim to an indurating process when effected by such constituents, as my invention in this respect consists in subjecting the molded material to the action of the vapors of sulphuric acid, hydrochloric acid, and carbonic acid and steam commingled as herein set forth. Neither do I broadly claim that part of the apparatus consisting of an indurating-chamber provided with means for generating and inducting the vapors, my improvements in such apparatus and its adjuncts being hereinbefore fully described; and they consist in the novel features particularly and distinctly pointed out in the claims.

What I claim as my invention, and desire to secure by Letters Patent, is—

1. As a step in the process of preparing material for artificial stone, washing the sand with water to remove all earthy and light matter, and then confining the sand in a suitable vessel and subjecting it with or without agitation to a heated vapor-bath, substantially as set forth.

2. As a step in the process of preparing material for artificial stone, washing the sand with water to remove the earthy and light matter, and then confining the sand in a suitable vessel and therein subjecting it with or without agitation to the action of steam commingled with sulphuric acid, substantially as and for the purpose set forth.

3. The herein-described process for making artificial stone, which consists in washing the sand with water to remove the earthy and light matter, then confining the sand in a suitable vessel, and subjecting it with or without agitation thereof to the action of steam commingled with sulphuric acid, then mixing the purified sand with the plastic material for forming the same into shapes, then placing the molded shapes in a curing-chamber and subjecting them to the actions of steam commingled with the vapors of sulphuric acid, hydrochloric acid, and carbonic acid, substantially as set forth.

4. In combination with a steam-boiler and a steam-conducting pipe, the acid-chamber C, opening into the steam-conducting pipe, and provided with a stop-cock, and the sand-cleansing chamber or receptacle B, provided with tubular trunnions having fitted therein induction and eduction pipes $b$ and $c$, substantially as described.

5. In combination with a steam-boiler and a steam-conducting pipe leading therefrom, the vaporizing-vessel F, provided with a perforated cover, and having the end of the steam-conducting pipe depending therein, substantially as described, and for the purpose set forth.

6. In combination with a steam-boiler and a steam-conveying pipe leading therefrom, the vaporizing-vessel F, provided with a perforated cover, and having the end of the steam-conveying pipe depending therein, and the steam-heating pipes H, arranged within the indurating-chamber, substantially as described.

7. In an apparatus for indurating artificial stone, the combination of the vaporizing-vessel F, having a removable perforated top, and the indurating-chamber provided with a safety trap-door, substantially as described.

8. The organized apparatus herein described, consisting of the steam-boiler D, steam-pipe E, with connections, sand-receptacle B, acid-chamber C, vaporizing-chamber F, steam-heating pipes H, and curing-room I, arranged and combined substantially as and for the purpose set forth.

9. The organized apparatus herein described, consisting of the sand trough or box A, sand-receptacle B, acid-chamber C, steam-pipe E, with connections, steam-boiler D, vaporizing-chamber F, steam-heating pipes H, and curing-room I, arranged and combined substantially as and for the purpose set forth.

In testimony whereof I have affixed my signature in presence of two witnesses.

AMOS A. McCANDLISS.

Witnesses:
M. H. JONES,
WALTER D. JONES.